United States Patent
Arakawa et al.

(10) Patent No.: US 7,876,360 B2
(45) Date of Patent: Jan. 25, 2011

(54) IMAGE DATA TRANSFER PROCESSOR AND SURVEILLANCE CAMERA SYSTEM

(75) Inventors: Kenji Arakawa, Kyoto (JP); Toshinobu Hatano, Kyoto (JP); Taichi Nagata, Osaka (JP); Kentaro Takakura, Osaka (JP)

(73) Assignee: Panasonic Corporation, Osaka (JP)

( * ) Notice: Subject to any disclaimer, the term of this patent is extended or adjusted under 35 U.S.C. 154(b) by 1031 days.

(21) Appl. No.: 11/699,567

(22) Filed: Jan. 30, 2007

(65) Prior Publication Data
US 2007/0177015 A1 Aug. 2, 2007

(30) Foreign Application Priority Data
Jan. 30, 2006 (JP) .............................. 2006-020330

(51) Int. Cl.
H04N 5/232 (2006.01)
H04L 5/14 (2006.01)
(52) U.S. Cl. .............................. 348/211.11; 348/211.4; 348/211.13; 370/294
(58) Field of Classification Search .............. 348/211.4, 348/211.8, 211.11, 211.13, 333.05, 441, 348/231.6, 143, 159, 14.12; 345/73, 91; 375/295; 725/98; 370/280, 294
See application file for complete search history.

(56) References Cited

U.S. PATENT DOCUMENTS

| | | | | |
|---|---|---|---|---|
| 5,587,742 A | * | 12/1996 | Hau et al. | 348/441 |
| 6,259,704 B1 | * | 7/2001 | Asahina et al. | 370/460 |
| 6,791,602 B1 | * | 9/2004 | Sasaki et al. | 348/159 |
| 7,405,755 B2 | * | 7/2008 | Aoyama | 348/231.99 |
| 7,486,308 B1 | * | 2/2009 | Kori et al. | 348/143 |
| 2003/0011678 A1 | * | 1/2003 | Chun | 348/143 |
| 2003/0059204 A1 | * | 3/2003 | Obara | 386/92 |
| 2005/0190263 A1 | | 9/2005 | Monroe et al. | |

FOREIGN PATENT DOCUMENTS

JP 2005-167602 6/2005

* cited by examiner

*Primary Examiner*—Nhan T Tran
(74) *Attorney, Agent, or Firm*—McDermott Will & Emery LLP

(57) ABSTRACT

An image data processor converts an image signal into an image data. The multi-codec unit converts the image data into a transfer data. A communication unit receives a transfer request from an outside terminal device and transmits the transfer data to the outside terminal device. A time-sharing control unit controls to drive the image data processor and the multi-codec unit in a time-sharing manner in accordance with the transfer request. A transfer data selecting unit for selecting the transfer data corresponding to the transfer request from a group of the transfer data generated by the image data processing unit and the multi-codec unit which are controlled to drive in the time-sharing manner by the time-sharing management unit, and transmitting the selected transfer data to the communication unit.

4 Claims, 10 Drawing Sheets

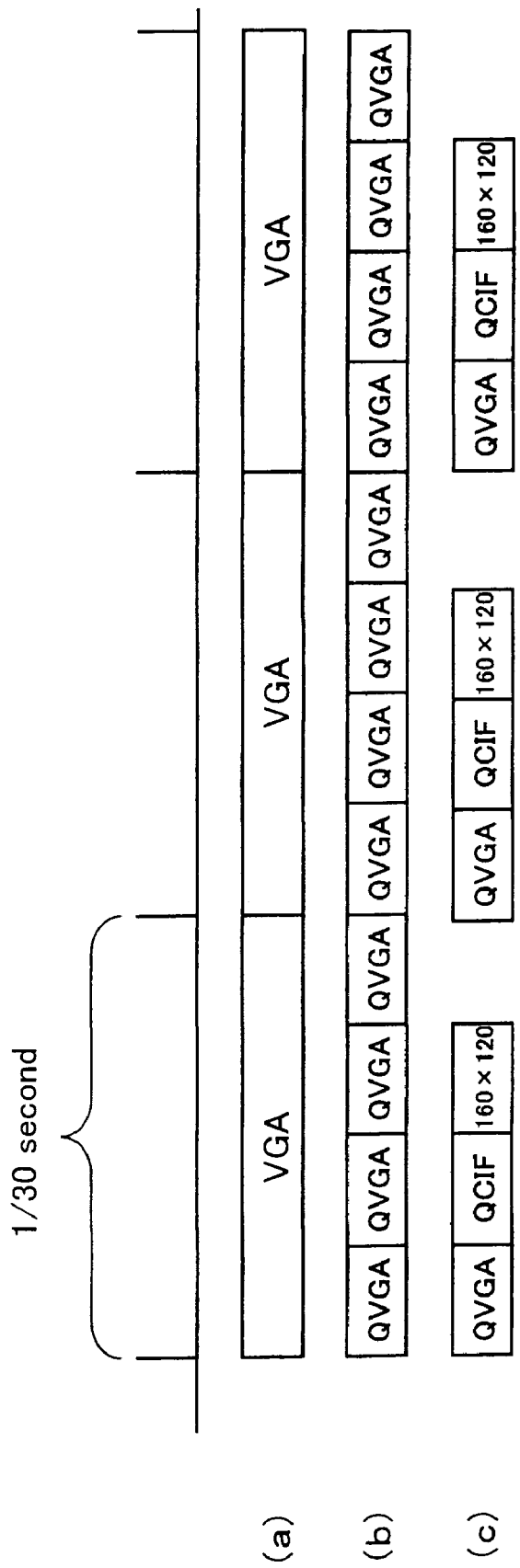
F I G. 4

IMAGE DATA TRANSFER PROCESSOR AND SURVEILLANCE CAMERA SYSTEM

BACKGROUND OF THE INVENTION

1. Field of the Invention

The present invention relates to an image data transfer processor and a surveillance camera system comprising the image data transfer processor.

2. Description of the Related Art

In a conventional surveillance camera system, as recited in, for example, No. 2005-167602 of the Japanese Patent Applications Laid-Open, image signals obtained by a plurality of surveillance cameras are selected by a switcher, and then supplied to a recorder for recording, and then, image data is read from the recorder in accordance with a image transfer request from a terminal device connected via a communication network and transmitted to the terminal device so that the observation image is monitored in the terminal device.

In the above conventional technology wherein time management is carried out in units of a frame rate of the image signal. Additionally, as an image signal cannot be processed in a plurality of sizes, the outputted image data cannot be displayed in some terminal devices because the size thereof is fixed. Further, it is necessary that the plurality of cameras be of a same format because the image signals of the plurality of cameras are inputted through changeover, and besides the plurality of cameras are constantly driven, which generates unnecessary power consumption in the camera whose output image signal is not selected.

SUMMARY OF THE INVENTION

Therefore, a main object of the present invention is to be able to process an image signal in a plurality of sizes, make it unnecessary to use a plurality of photographing devices having a same data format and additionally reduce power consumption.

In order to achieve the object, an image data transfer processor according to the present invention comprises: an image data processing unit for converting an image signal into an image data;

a multi-codec unit for converting the image data into a transfer data;

a communication unit for receiving a transfer request from an external terminal device and transmitting the transfer data to the terminal device;

a time-sharing management unit for controlling to drive the image data processing unit and the multi-codec unit in a time-sharing manner in accordance with the transfer request; and a transfer data selecting unit for selecting the transfer data corresponding to the transfer request from the transfer data generated by the image data processing unit and the multi-codec unit which are controlled to drive in the time-sharing manner by the time-sharing management unit and transmitting the selected transfer data to the communication unit.

In the above constitution, when the transfer request including information on the transfer data requested by the terminal device is transmitted, the communication unit receives the transfer request and transmits it to the transfer data selecting unit. The transfer data selecting unit transmits the received transfer request to the time-sharing management unit. When the transfer requests are simultaneously received from a plurality of terminal devices, the respective transfer requests are transmitted to the time-sharing management unit. The time-sharing management unit controls the image data processing unit and the multi-codec unit in the time-sharing manner in accordance with the respective received transfer requests. The imaged at a processing unit converts the inputted image signal into the image data based on the time-sharing control by the time-sharing management unit. The multi-codec unit converts the image data into the transfer data based on the time-sharing control by the time-sharing management unit. The generated transfer data is directly or indirectly selected by the transfer data selecting unit and transmitted to the original terminal device which requested the transfer data via the communication unit. The word "indirectly" means that the transfer data is transmitted via a memory device.

As the above-described processing is executed based on the time-sharing control by the time-sharing management unit, it becomes possible to correspond to the simultaneous transfer requests from the plurality of terminal devices. Therefore, the image data can be delivered depending on the respective transfer requests from the plurality of terminal devices in the present invention.

In order to obtain the foregoing effect, it is preferable in the present invention that:

The time-sharing management unit control to drive the image data processing unit and the multi-codec unit in the time-sharing manner based on a cycle equal to or shorter than a frame cycle of the image signal in accordance with the transfer request.

The multi-codec unit compresses the image data to thereby convert it into the transfer data.

The image signal is a plurality of image signals.

The image signal is a plurality of image signals filmed by a plurality of photographing devices.

Further, it is preferable that the time-sharing management unit generates a photographing control signal for controlling to drive the plurality of photographing devices in the time-sharing manner, and the communication unit transmits the photographing control signal to the photographing devices in the case where the image signal is the plurality of image signals filmed by the plurality of photographing devices. By doing this, the photographing devices can also be controlled in accordance with the transfer request.

In the image data transfer processor according to the present invention, there is an embodiment where the image data processing unit converts the image signal into a plurality of image data consisting of a combination of an image data having a size equal to that of the image signal and at least an image data having a size different from that of the image data, the multi-codec unit selectively converts the image data having an image size corresponding to the transfer request into the transfer data, and the transfer data selecting unit transmits the transfer data having the image size corresponding to the transfer request to the communication unit.

According to the constitution, the image data processing unit performs control for changing the image size in accordance with the transfer request based on the time-sharing control by the time-sharing management unit. As a result, the image data having the image sizes corresponding to the transfer requests from the plurality of terminal devices can be delivered.

In the image data transfer processor according to the present invention, there is an embodiment that the image data processing unit converts the image signal into the image data so that the image data of an aspect ratio different from that of the image signal is included therein. According to this, even in the case where the aspect ratio is different in a display device of each terminal device and an enlarging/reducing function is not provided in the terminal device, the transfer data corresponding to the transfer request of the terminal device can be delivered.

Additionally, in the image data transfer processor according to the present invention, there is an embodiment that the time-sharing management unit controls the multi-codec unit in the time-sharing manner under such a condition as $S \cdot T \geq S_0 \cdot t_0 + S_1 \cdot t_1 + \ldots + S_{n-1} \cdot t_{n-1}$ provided that a largest size of the image data is S, a maximum frame rate is T when the largest size of the image data is S, the sizes of n pieces of image data are $S_0, S_1, \ldots S_{n-1}$, and the frame rates of the respective image data are $t_0, t_1, \ldots t_{n-1}$.

According to the constitution, the time-sharing processing can be managed accurately and easily, and the plurality of images can be processed in the plurality of sizes in accordance with the throughput of the multi-codec unit per unit time. The maximum throughput of the multi-codec unit is denoted by S·T.

In the image data transfer device constituted as above, there is an embodiment that it comprises an image signal processing unit for converting the inputted image signals having the plurality of different formats to a predetermined format which can be processed in the image data processing unit by rearranging pixel values thereof and outputting the format-converted image signals to the image data processing unit.

According to the constitution, it becomes unnecessary that the image pickup formats of the plural imaging devices connected to the image data transfer processor is unified. For example, it becomes possible that one of the photographing devices may be a CCD sensor and another may be a CMOS sensor are used. Thus, the image data transfer processor can extend its versatility.

There is an embodiment that the image data transfer processor according to the present invention further comprises an image signal switchover unit for selecting one of the plurality of image signals and outputting the selected image signal to the image signal processing unit.

According to the constitution, even in the case where the plurality of photographing devices is connected, the image signals outputted from the respective photographing devices can be selected in the image signal switchover unit and supplied to the image signal processing unit. Therefore, the image signal processing unit can be more simplified. If the image signal switchover unit is provided outside LSI as a main component in which the image data transfer processor according to the present invention is mounted, number of input pins of the LSI can be reduced.

In the image data transfer processor according to the present invention, there is an embodiment that the image data processing unit executes at least one conversion of the enlargement or reduction of an original image to thereby generate the image data.

According to the constitution, the image data of a plurality of sizes can be generated from one image, and the image data corresponding to the transfer request (size request) of the terminal device can be transferred.

Moreover, there is an embodiment that the image data transfer processor according to the present invention further comprises an image data input unit for converting another image data having a format different from that of the image data into a data which can be processed in the image data processing unit. According to the constitution, it can be handled even in the case where the output of the photographing device has already been converted from the image signal into the image data.

There is an embodiment that the image data transfer processor according to the present invention further comprises:
a memory device; and
a memory controller, wherein
the image signal processing unit stores the format-converted image signal in the memory device via the memory controller,
the image data processing unit reads the format-converted image signal from the memory device via the memory controller and converts the read image signal into the image data, and then, stores the image data in the memory device via the memory controller, and
the multi-codec unit reads the image data from the memory device via the memory controller and converts the read image data into the transfer data, and then, stores the transfer data in the memory device via the memory controller, and
the transfer data selecting unit reads the transfer data from the memory device via the memory controller and outputs the read transfer data to the communication unit.

Examples of the memory device include SDRAM, DDR-SDRAM and the like.

According to the constitution, it makes possible such handling that each of the image data can be read from the memory device and converted into the transfer data after the image data having a plurality of frames is stored in the memory device through reading and utilizing the image data from the memory device after storing it in the memory device. The transfer data selecting unit may directly fetch the transfer data from the multi-codec unit.

Furthermore, in the image data transfer processor according to the present invention, there is an embodiment that the image signal is a plurality of image signals, the image data processing unit converts a plurality of image data from the plurality of image signals,
the multi-codec unit stores a differential data between each frame and a frame prior to the relevant frame in the memory device via the memory controller, and
when the image data in the next frame of the respective frames of the plurality of image data is converted into the transfer data, the multi-codec unit reads the differential data between the relevant frame and the previous frame, the image data of the previous frame and the image data of the next frame from the memory device via the memory controller, and then executes the processing based on these data.

According to the constitution, it is possible to correspond to the conversion formats (MPEG, MPEG2, MPEG4, H.264 and the like) of the transfer data generating the transfer data by using and compressing the previous information (P picture).

There is an embodiment that is preferably configured in such a manner that the multi-codec unit of the image data transfer processor according to the present invention stores the image data of the next frame in a recording region different from that of the last frame of the next frame in the memory device every time when the plurality of image data is converted into the transfer data.

According to the constitution, it becomes unnecessary to retain the image data of the previous frame in each image signal in the image data region of the memory device. Therefore, the image data can be converted into the transfer data in the memory space managed by the multi-codec unit, which facilitates management of addresses in the memory device.

A surveillance camera system according to the present invention comprises:

the image data transfer processor according to the present invention described above;

at least one of a photographing device for supplying the image signal to the image data transfer processor;

a display unit for outputting the image data;

a display device for displaying the image data outputted from the display unit; and an operation unit for receiving the transfer request made by an operator based on his/her visual confirmation of the image data displayed on the display device and outputting the received transfer request to the transfer data selecting unit.

According to the constitution, only the transfer data, that is selected via the operation unit based on an confirmation of a plurality of images displayed on the display device by the operator, can be transmitted from the image data transfer processor to the terminal device.

The surveillance camera system according to the present invention takes an embodiment that the image data processing unit resizes the image data selected by the operation unit into that of the transfer request when the size of the image data is different to that of the transfer request, and the multi-codec unit converts the resized image data into the transfer data.

According to the constitution, the transfer data can be surely transferred in accordance with the size of the transfer request.

In the surveillance camera system according to the present invention, there is an embodiment that a plurality of photographing devices is provided as the photographing device, and the time-sharing management unit drives the photographing device which outputs the image signal with the transfer request and halts the photographing device which outputs the image signal without the transfer request. According to the constitution, only the photographing device requested to transfer is driven, while the photographing device without request is halted. As a result, power consumption can be reduced.

In the surveillance camera system according to the present invention, there is an embodiment that a plurality of image data transfer processors is provided as the image data transfer processor, the transfer data selecting unit in each of the image data transfer processors transmits the transfer request received from the operation unit to the other image data transfer processor, and then receives the transfer data transmitted by the other image data transfer processor in response to the transfer request via the communication unit, the multi-codec unit converts the received transfer data into the image data, the image data processing unit resizes the image data converted from the received transfer data, and the display unit outputs the resized image data to the display device.

According to the constitution, the plurality of image data transfer processors is connected so that the transfer data can be not only transmitted but also received.

As stated above, according to the present invention, the image data can be delivered in accordance with the respective transfer requests of the plurality of terminal devices. Further, the image data can be delivered in the image sizes corresponding to the respective transfer requests of the plurality of terminal devices.

Further, it becomes unnecessary for the photographing formats of the plurality of photographing device to be unified.

For example, it enables such usage that one of the photographing devices may be a CCD sensor and the other may be a CMOS sensor. Thus, the photographing device can extend its versatility. More specifically, various requests can be responded with respect to different sizes and characteristics of the image signal by making the inputted data to be a plurality of formats. Further, only the photographing device requested to transfer is driven, while the photographing device without request is halted in the state where the plurality of photographing devices is connected. As a result, the power consumption can be reduced.

The technology according to the present invention is effective for a surveillance camera system for monitoring and the like by displaying filming images obtained at a plurality of positions in a building or a station on a monitor.

BRIEF DESCRIPTION OF THE DRAWINGS

These and other objects as well as advantages of the invention will become clear by the following description of preferred embodiments of the invention. A number of benefits not recited in this specification will come to the attention of those skilled in the art upon the implementation of the present invention.

FIG. 4 is a conceptual view wherein a time-sharing management unit controls a multi-codec unit in the surveillance camera system according to the preferred embodiment.

DETAILED DESCRIPTION OF THE INVENTION

Figure 1:
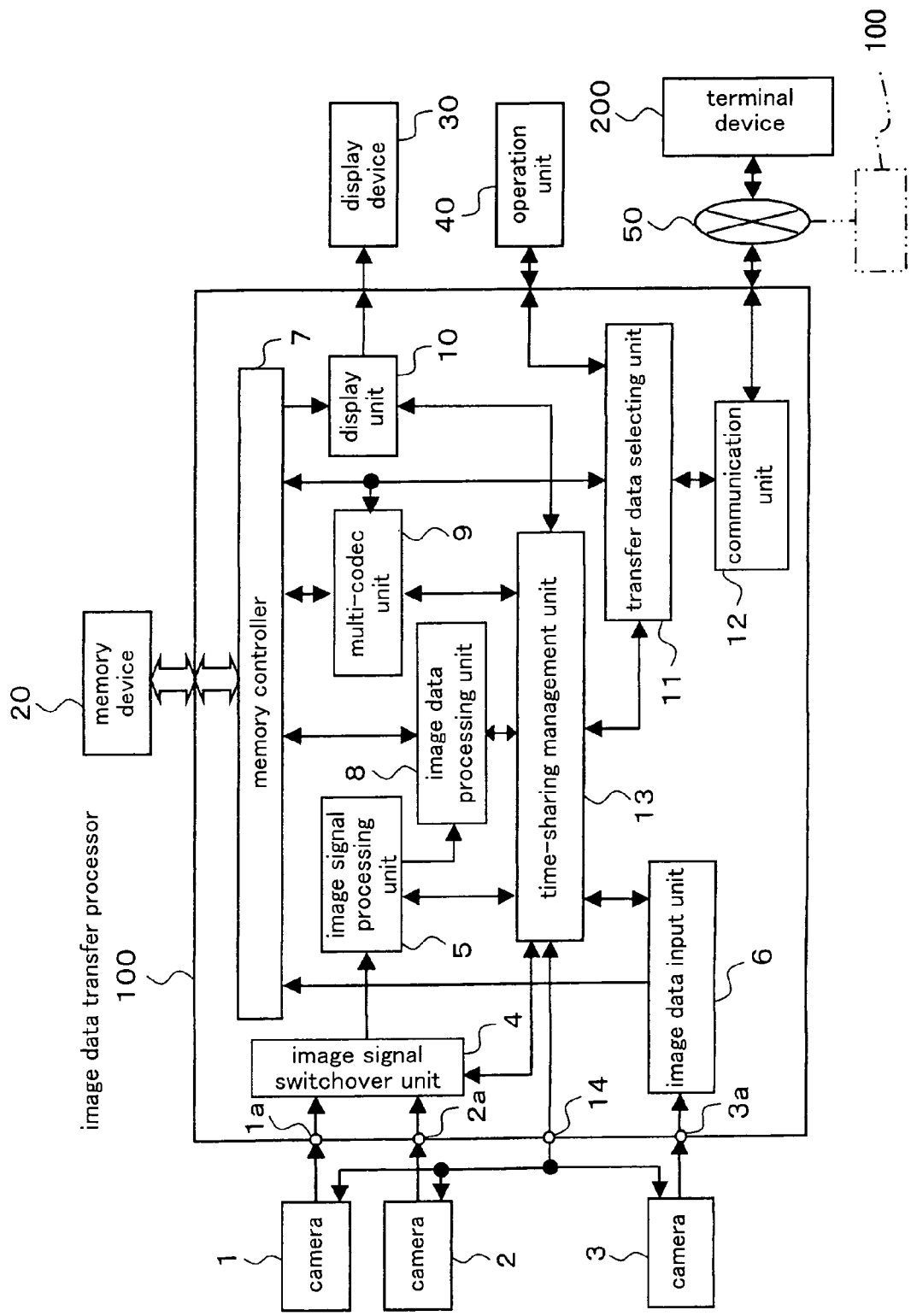
FIG. 1 is a block diagram illustrating a constitution of a surveillance camera system according to a preferred embodiment of the present invention.

Hereinafter, preferred embodiments of an image data transfer processing and a surveillance camera system according to the present invention are described in detail referring to the drawings. FIG. 1 is a block diagram illustrating a constitution of a surveillance camera system including an image data transfer processor according to a preferred embodiment of the present invention. In FIGS. 1, 1a and 2a denote image signal input terminals, 3a denotes an image data input terminal, 4 denotes an image signal switchover unit, 5 denotes an image signal processing unit, 6 denotes an image data input unit, 7 denotes a memory controller, 8 denotes an image data processing unit, 9 denotes a multi-codec unit, 10 denotes a display unit, 11 denotes a transfer data selecting unit, 12 denotes a communication unit, 13 denotes a time-sharing management unit, and 14 denotes a camera drive setting input/output terminal. These components constitute an image data transfer processor 100.

The image signal switchover unit 4 selects and outputs one of a plurality of image signals inputted from image signal input terminals 1a and 2a. The image data processing unit 8 converts the inputted image signal into an image data. The image signal processing unit 5 rearranges pixel values of the image signals having a plurality of different formats inputted from the image signal switchover unit 4 to thereby convert the formats of the image signals into a predetermined format which can be processed by the image data processing unit 8, and outputs the format-adjusted image signal to the image data processing unit 8. The image data input unit 6 fetches the image data inputted from the image data input terminal 3a and converts the format of the fetched image data into a predetermined format which can be processed in the image data processing unit 8. The memory controller 7 accesses the memory device 20. The multi-codec unit 9 compresses the image data converted in the image data processing unit 8 and stored in the memory device 20 in order to convert the compressed image data into a transfer data. The display unit 10 outputs the image data so that it is displayed. The transfer data selecting unit 11 delivers a transfer request received from a terminal device 200 via the communication unit 12 to the time-sharing management unit 13, and selects the transfer data corresponding to the transfer request from the transfer data converted by the multi-codec unit 9 and transmits the selected transfer data to the communication unit 12. The communication unit 12 transmits and receives the data between the terminal device 200 via a communication network 50 to thereby relay the transfer request from the terminal device 200, and transmits the inputted transfer data to the terminal device 200. The time-sharing management unit 13 controls to drive the image signal switchover unit 4, image signal processing unit 5, image data input unit 6, image data processing unit 8, multi-codec unit 9, display unit 10, and transfer data selecting unit 11 in a time-sharing manner based on a cycle equal to or shorter than a frame cycle of the image signal in accordance with the received transfer request.

As external components of the image data transfer processor 100, 1, 2 and 3 denote cameras (photographing devices) 20 denotes a memory device for recording the image data and the like, 30 denotes a display device, 40 denotes an operation unit, 50 denotes an existing communication network such as Internet, and 200 denotes the terminal device. The display unit 30 displays the image data outputted by the display unit 10. The operation unit 40 selects the transfer data from the image data displayed on the display device 30 based on the operation to the transfer data selecting unit 11 and outputs it. There is a case where a same device as the image data transfer processor 100 is employed as the terminal device 200.

The time-sharing management unit 13 in the image data transfer processor 100 is connected to control input terminals of the first through third cameras 1-3 via the camera drive setting input/output terminal 14. The time-sharing management unit 13 timing-controls the image signal switchover unit 4, image signal processing unit 5, image data input unit 6, image data processing unit 8, multi-codec unit 9, display unit 10 and transfer data selecting unit 11.

Respective image signal output terminals of the first and second cameras 1 and 2 are connected to the image signal switchover unit 4 via the image signal input terminals 1a and 2a of the image data transfer processor 100. The third camera 3 is connected to the image data input unit 6 via the image data input terminal 3a. The image signal switchover unit 4 switches over between an image signal of CH1 by the first camera 1 and an image signal of CH2 by the second camera 2, and outputs the selected image signal to the image signal processing unit 5. The switchover operation of the image signal switchover unit 4 is controlled with the time-sharing management unit 13. The time-sharing management unit 13 controls the image signal switchover unit 4 in such a manner that the image signals of a plurality of channels is switched, for example, per frame. Under the control by the time-sharing management unit 13, the output of the image signal switchover unit 4 is switched over in the order of CH1, CH2, CH1, CH2 . . . , per frame, and then, the image signals of the plurality of channels are mixed in the time-sharing manner.

The image data of CH3 by the third camera 3 is converted in the image data input unit 6 into such a format that can be handled by the image data processing unit 8, and then stored in the memory device 20 via the memory controller 7.

The image signal is inputted from the image signal switchover unit 4 to the image signal processing unit 5. The image signal processing unit 5 converts the format of the inputted image signal into such a format that can be processed by the image data processing unit 8, and outputs the format-converted image signal to the image data processing unit 8. It is assumed that, for example, the first camera 1 is a conventional CCD and the second camera 2 is a pixel-mixed CCD wherein the signal formats thereof are different to each other. In the case of the conventional CCD, the image signals in RGRG . . . lines and GBGB . . . lines are alternately outputted. In the case of the pixel-mixed CCD, such image signals as RBRGGG . . . are outputted. The image signal processing unit 5 rearranges the pixel values of the image signals of the pixel-mixed CCD to thereby convert the format of the image signal into such a predetermined format that can be processed with the same one as that of the conventional CCD in the image data processing unit 8, and then, outputs the format-adjusted image signal to the image data processing unit 8.

The image data processing unit 8 converts the format-adjusted image signal inputted from the image signal processing unit 5 into the image data such as a luminance signal (Y) and a color-difference signal (Cb, Cr), and stores the converted image data in the memory device 20 via the memory controller 7.

The image data processing unit 8 also has such a resizing function as enlargement and reduction of the image data. Further, the image data processing unit 8 has a function for changing a size and an aspect ratio of the image data. The image data processing unit 8 can also generate such an image data as 720 pixels×480 pixels for SDTV display.

The multi-codec unit 9 sequentially reads the corresponding image data from the memory device 20 via the memory controller 7 based on the control of the time-sharing management unit 13 and compression-encodes the read image data, adds a channel discrimination signal and a time code signal to the compression-encoded image data, and then stores the resulting image data in the memory device 20 via the memory controller 7. There may be a case that the multi-codec unit 9 may directly transmit the compression-encoded image data to the transfer data selecting unit 11. The multi-codec unit 9 compression-encodes the image data with such a compression format as JPEG, MPEG2, MPEG4 or H.264. The channel discrimination signal and the time code signal are added to the image data under the instruction from the time-sharing management unit 13.

The display unit 10 reads the image data from the memory device 20 via the memory controller 7 and outputs the read image data to the display device 30. In the display device 30, the image of the channel desired by the operator (observer) or the multi-displaying image of the respective channels is displayed. Examples of the display device 30 include CRT, LCD, an organic EL display and the like.

The transfer data selecting unit 11 selects the transfer data in accordance with the transfer request supplied from the terminal device 200 via the communication network 50 and the communication unit 12, and transmits the selected transfer data to the terminal device 200 which is a demander via the communication unit 12 and the communication network 50. More specifically, the transfer data selecting unit 11 selects the transfer data in accordance with the transfer request from the transfer data outputted from the multi-codec unit 9 or the transfer data stored in the memory device 20, and transmits the selected transfer data to the terminal device 200 via the communication unit 12 and the communication network 50.

The communication unit 12 executes a bilateral communication with the terminal device 200 via the communication network 50. The transfer request in the terminal device 200 includes URL (Uniform Resource Locator), channel designating data for designating the channel and time designating data. The time designating data shows whether the relevant transfer data is the real-time transfer data outputted from the from the multi-codec unit 9 or which time zone of the past transfer data recorded in the memory device 20. The communication unit 12 which received the transfer request having such a data structure notifies the transfer data selecting unit 11 of the received transfer request. The transfer data selecting unit 11 which received the transfer request selects the transfer data corresponding to the transfer request and delivers the selected transfer data to the terminal device 200 which requested the transfer data.

Next, an operation of the surveillance camera system according to the present preferred embodiment thus constituted is described below. The transfer data selecting unit 11 monitors what kind of data transfer request is transmitted from the terminal device 200 to the communication unit 12 via the communication network 50. When the data transfer request is transmitted, the transfer data selecting unit 11 notifies the time-sharing management unit 13 of control information in accordance with the transmitted data transfer request. The control information includes information showing which of the image signals of the three cameras 1, 2 and 3 is requested to transfer and what size of the image signal is requested to transfer.

Assuming that the image data of CH1 by the first camera 1, the image data of CH2 by the second camera 2 and the image data of CH3 by the third camera 3 are requested. In this case, the time-sharing management unit 13 controls the three cameras 1, 2 and 3, image signal switchover unit 4, image signal processing unit 5, image data input unit 6, image data processing unit 8, multi-codec unit 9 and transfer data selecting unit 11 at such a timing cycle that CH1, CH2, CH3, CH1, CH2, CH3 . . . are repeated.

Figure 2:
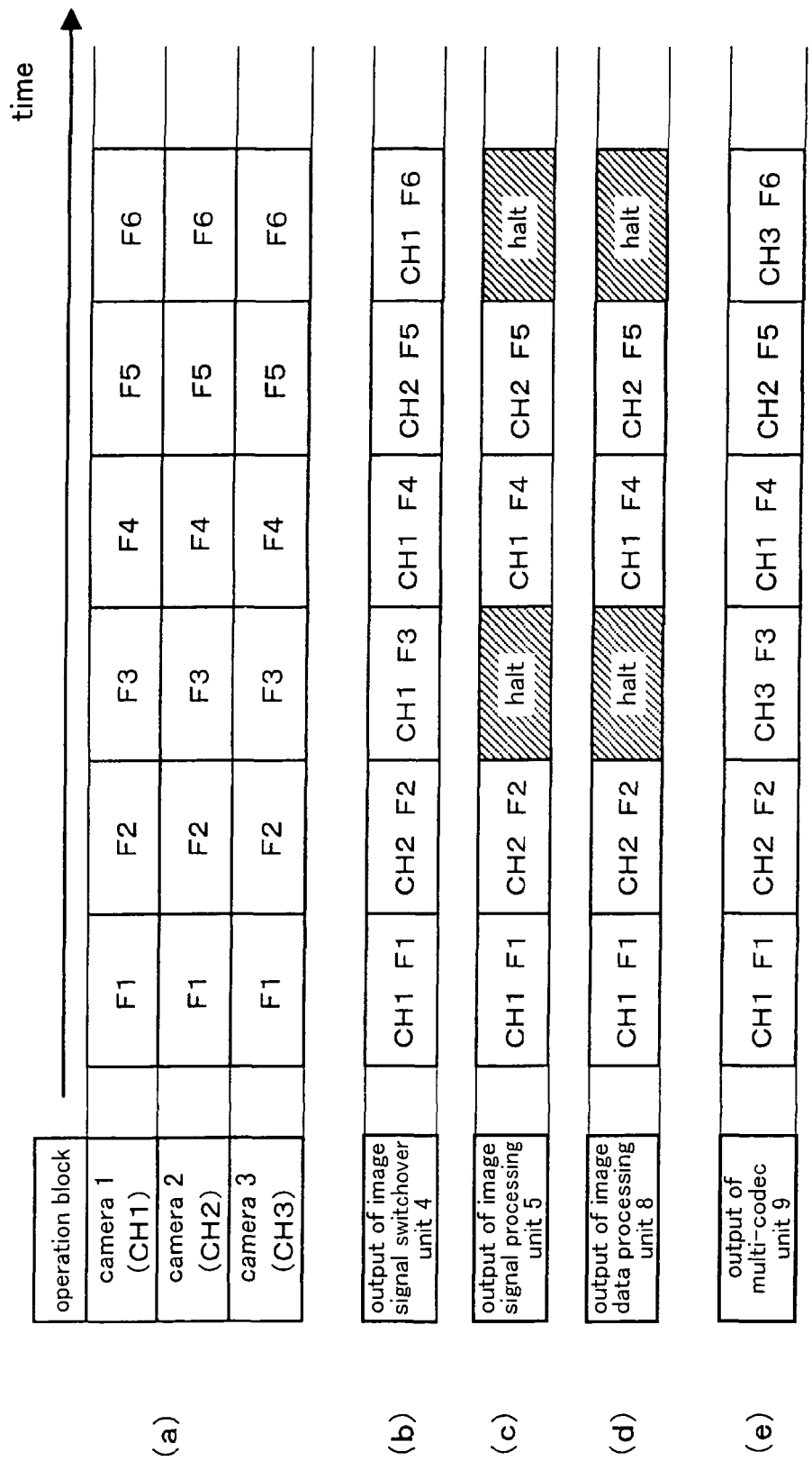
FIG. 2 is a view of respective block processing states, which shows an operation when an energy consumption mode is inactive in the surveillance camera system according to the preferred embodiment.

FIG. 2 shows an operation in the case where the transfer request for the image data by the three cameras 1, 2 and 3 is received from the terminal device 200 via the communication network 50. First an operation is described in the case where a normal mode, which is not an energy-saving mode, is selected. a) shown in FIG. 2 shows the image signal inputted to the image signal switchover unit 4, and b) shown in FIG. 2 shows the image signal outputted from the image signal switchover unit 4. In the drawing, CHn (n=1, 2, 3) denotes a channel number, and frame Fm (m=1, 2, 3 . . . ) denotes a frame number. CH1 shows that the image signal was obtained by the first camera 1, CH2 shows that the image signal was obtained by the second camera 2, and CH3 shows that the image signal was obtained by the third camera 3.

The time-sharing management unit 13 controls all of the three cameras 1, 2 and 3 to be constantly driven as shown in (a) of FIG. 2. The time-sharing management unit 13 further timing-controls the image signal switchover unit 4 as shown (b) of in FIG. 2. More specifically, the time-sharing management unit 13 controls the image signal switchover unit 4 so that the following operations in first through third periods are cyclically executed in the image signal switchover unit 4. The cyclic control is executed per frame, and the first through third periods are referred to as first through third frame periods.

In the first frame period, the image signal of a frame F1 in CH1 is outputted to the image signal processing unit 5 via the image signal switchover unit 4.

In the second frame period, the image signal of a frame F2 in CH2 is outputted to the image signal processing unit 5 via the image signal switchover unit 4.

In the third frame period, the image signal of a frame F3 in CH3 is outputted to the image signal processing unit 5 via the image signal switchover unit 4.

Additionally, the time-sharing management unit 13 timing-controls the image signal processing unit 5 as shown in (c) of FIG. 2. More specifically, the time-sharing management unit 13 controls the image signal processing unit 5 so that the following operations in the first through third frame periods are cyclically executed in the image signal processing unit 5.

In the first frame period, the image signal of the frame F1 in CH1 supplied to the image signal processing unit 5 via the image signal switchover unit 4 is converted to such a format that can be handled in the image data processing unit 8, and the format-adjusted image signal is outputted to the image data processing unit 8 from the image signal processing unit 5.

In the second frame period, the image signal of the frame F2 in CH2 supplied to the image signal processing unit 5 via the image signal switchover unit 4 is converted to such a format that can be handled in the image data processing unit 8, and the format-adjusted image signal is outputted to the image data processing unit 8 from the image signal processing unit 5.

In the third frame period, the operation of the image signal processing unit 5 is halted. The operation of the image signal processing unit 5 is halted because image signal to be processed is not inputted from the image signal switchover unit 4, and it is no use continuing the operation of the image signal processing unit 5 during this period. The power consumption can be controlled correspondingly since the operation of the image signal processing unit 5 is halted during the third period.

The time-sharing management unit 13 timing-controls the image data processing unit 8 as shown in (d) of FIG. 2. More specifically, the time-sharing management unit 13 controls the image data processing unit 8 so that the following operations in the first through third frame periods are cyclically executed in the image data processing unit 8.

In the first frame period, the format-converted image signal of the frame F1 in CH1 supplied to the image data processing unit 8 from the image signal processing unit 5 is converted into the image data, and the converted image data is stored in the memory device 20 via the memory controller 7.

In the second frame period, the format-converted image signal of the frame F2 in CH2 supplied to the image data processing unit 8 from the image signal processing unit 5 is converted into the image data, and the converted image data is stored in the memory device 20 via the memory controller 7.

In the third frame period, the operation of the image data processing unit 8 is halted. The operation of the image data processing unit 8 is halted because there is no image signal to be processed, and it is no use of continuing the operation of the image data processing unit 8 during this period. The power consumption can be controlled correspondingly since the operation of the image data processing unit 8 is halted during the third period.

The time-sharing management unit 13 timing-controls the multi-codec unit 9 as shown in (e) of FIG. 2. More specifically, the time-sharing management unit 13 controls the multi-codec unit 9 so that the following operations in the first through third frame periods are cyclically executed in the multi-codec unit 9.

In the first frame period, the image data of the frame F1 in CH1 is read from the memory device 20 to the multi-codec unit 9 via the memory controller 7 and compression-encoded, then, the channel discrimination signal and the time code signal showing CH1 are added to the compression-encoded image data, and the resulting image data is stored again in the memory device 20.

In the second frame period, the image data of the frame F2 in CH2 is read from the memory device 20 to the multi-codec unit 9 via the memory controller 7 and compression-encoded, then, the channel discrimination signal and the time code signal showing CH2 are added to the compression-encoded image data, and the resulting image data is stored again in the memory device 20.

In the third frame period, the image data of the frame F3 in CH3 is read from the memory device 20 to the multi-codec unit 9 via the memory controller 7 and compression-encoded, then, the channel discrimination signal and the time code signal showing CH3 are appended to the compression-encoded image data, and the resulting image data is stored in the memory device 20 again.

Figure 3:
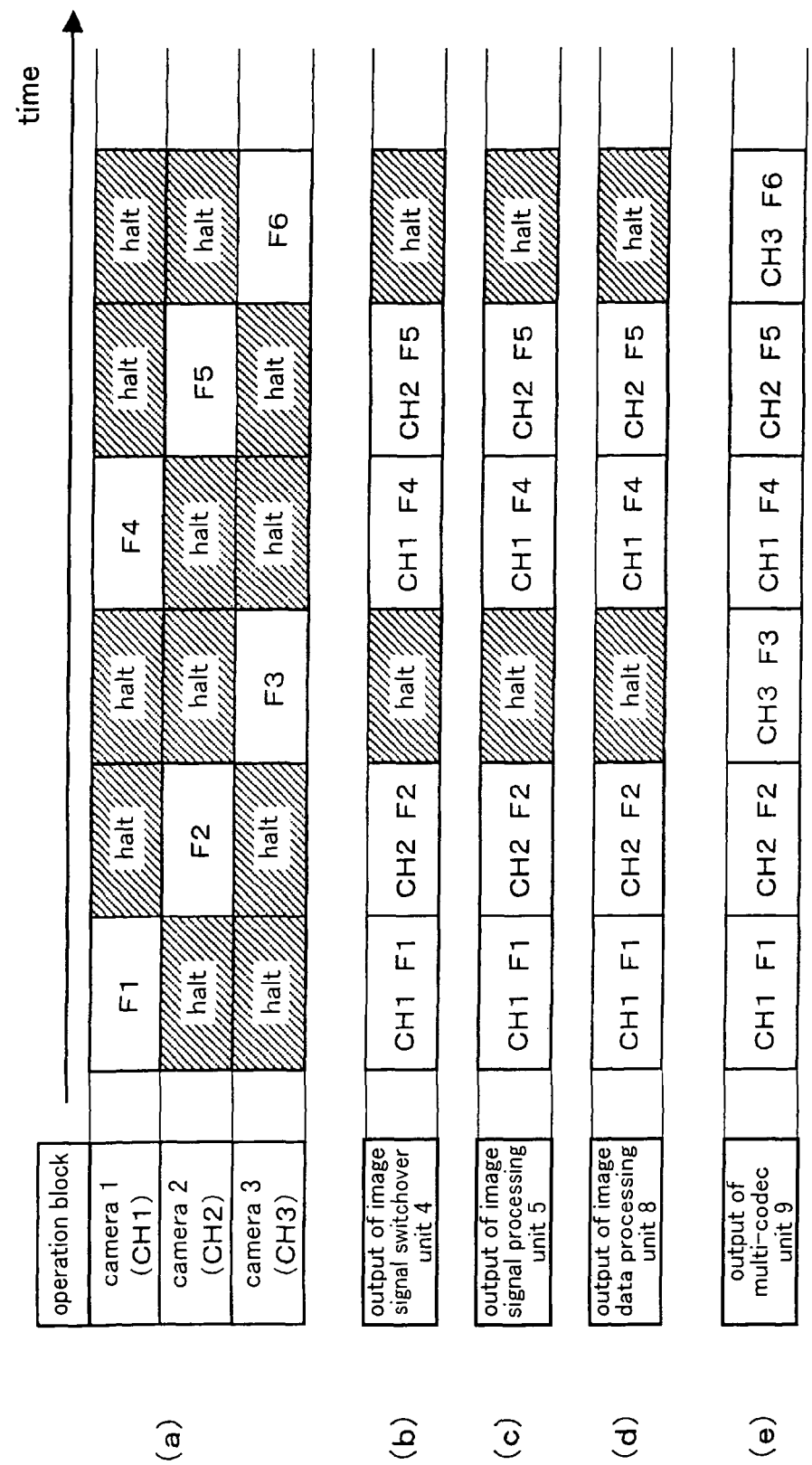
FIG. 3 is a view of block processing states, which shows an operation when the energy consumption mode is active in the surveillance camera system according to the preferred embodiment.

Next, an operation in the case where the energy-saving mode is selected is described referring to FIG. 3. FIG. 3 conforms to FIG. 2. In the case of this mode, the time-sharing management unit 13 drive-controls the three cameras 1, 2 and 3 in the time-sharing manner via the camera dive setting input/output terminal 14 as shown in (a) of FIG. 3. More specifically, the time-sharing management unit 13 controls the cameras 1, 2 and 3 so that the following operations in the first through third frame periods are cyclically executed in the cameras 1, 2 and 3.

In the first frame period, the first camera 1 is driven, and the second and third cameras 2 and 3 are halted. Thereby, the power consumption resulting from the second and third cameras 2 and 3 can be controlled.

In the second frame period, the second camera 2 is driven, and the first and third cameras 1 and 3 are halted. Thereby, the power consumption resulting from the first and third cameras 1 and 3 can be controlled.

In the third frame period, the third camera 3 is driven, and the first and second cameras 1 and 2 are halted. Thereby, the power consumption resulting from the first and second cameras 1 and 2 can be controlled.

The time-sharing management unit 13 timing-controls the image signal switchover unit 4 as shown in (b) of FIG. 3. The time-sharing management unit 13 controls the image signal switchover unit 4 so that the following operations in the first through third frame periods are cyclically executed in the image signal switchover unit 4.

In the first frame period, the image signal of the frame F1 in CH1 is outputted to the image signal processing unit 5 via the image signal switchover unit 4.

In the second frame period, the image signal of the frame F2 in CH2 is outputted to the image signal processing unit 5 via the image signal switchover unit 4.

In the third frame period, the operation of the image signal switchover unit 4 is halted. The operation of the image signal switchover unit 4 is halted during the third period because the image data in CH3 is to be processed and the first and second camera 1 and 2 are accordingly halted during this period, therefore, the image signals of CH1 and CH2 are not inputted to the image signal switchover unit 4. The power consumption can be controlled since the operation of the image signal switchover unit 4 is halted during the third period.

The time-sharing management unit 13 timing-controls the image signal processing unit 5 as shown in FIG. 3(*c*). More specifically, the time-sharing management unit 13 controls the image signal processing unit 5 so that the following operations in the first through third frame periods are cyclically executed in the image signal processing unit 5.

In the first frame period, the image signal of the frame F1 in CH1 supplied to the image signal processing unit 5 via the image signal switchover unit 4 is converted to such a format that can be handled in the image data processing unit 8, and the format-adjusted image signal is outputted to the image data processing unit 8 from the image signal processing unit 5.

In the second frame period, the image signal of the frame F2 in CH2 supplied to the image signal processing unit 5 via the image signal switchover unit 4 is converted to such a format that can be handled in the image data processing unit 8, and the format-adjusted image signal is outputted to the image data processing unit 8 from the image signal processing unit 5.

In the third frame period, the operation of the image signal processing unit 5 is halted. The operation of the image signal processing unit 5 is halted because there is no image signal to be processed inputted from the image signal switchover unit 4, and it is no use continuing the operation of the image signal processing unit 5 during this period. The power consumption can be controlled correspondingly since the operation of the image signal processing unit 5 is halted during the third period.

The time-sharing management unit 13 timing-controls the image data processing unit 8 as shown in (d) of FIG. 3. More specifically, the time-sharing management unit 13 controls the image data processing unit 8 so that the following operations in the first through third frame periods are cyclically executed in the image data processing unit 8.

In the first frame period, the format-converted image signal of the frame F1 in CH1 supplied to the image data processing unit 8 from the image signal processing unit 5 is converted into the image data, and the converted image data is stored in the memory device 20 via the memory controller 7.

In the second frame period, the format-converted image signal of the frame F2 in CH2 supplied to the image data processing unit 8 from the image signal processing unit 5 is converted into the image data, and the converted image data is stored in the memory device 20 via the memory controller 7.

In the third frame period, the operation of the image data processing unit 8 is halted. The operation of the image data processing unit 8 is halted because there is no image signal to be processed, and it is no use continuing the operation of the image data processing unit 8 during this period. The power consumption can be controlled correspondingly since the operation of the image data processing unit 8 is halted during the third period.

The time-sharing management unit 13 timing-controls the multi-codec unit 9 as shown in (e) of FIG. 3. More specifically, the time-sharing management unit 13 controls the multi-codec unit 9 so that the following operations in the first through third frame periods are cyclically executed in the multi-codec unit 9.

In the first frame period, the image data of the frame F1 in CH1 is read from the memory device 20 to the multi-codec unit 9 via the memory controller 7 and compression-encoded, then, the channel discrimination signal and the time code signal showing CH1 are added to the compression-encoded image data, and the resulting image data is stored again in the memory device 20.

In the second frame period, the image data of the frame F2 in CH2 is read from the memory device 20 to the multi-codec unit 9 via the memory controller 7 and compression-encoded, then, the channel discrimination signal and the time code signal showing CH2 are appended to the compression-encoded image data, and the resulting image data is stored again in the memory device 20.

In the third frame period, the image data of the frame F3 in CH3 is read from the memory device 20 to the multi-codec unit 9 via the memory controller 7 and compression-encoded, then, the channel discrimination signal and the time code signal showing CH3 are added to the compression-encoded image data, and the resulting image data is stored again in the memory device 20.

When the time-sharing management unit 13 controls the multi-codec unit 9 in the energy-saving mode as described referring to (e) of FIG. 3, only the transfer data requested to be transferred is selectively compression-encoded in a manner similar to the control of the multi-codec unit 9 by the time-sharing management unit 13 in the normal mode which was described referring to (e) of FIG. 3.

In addition, when the resizing of the image data in CH3 is requested from the terminal device 200, the image data processing unit 8 may be driven to resize the image data, though it is different to the foregoing description. When such a transfer request is made that requests the supply of the image data in any of CH1-CH3 after the aspect ratio thereof is changed, the image data processing unit 8 may be driven so that the aspect ratio can be adjusted, though it is different to the foregoing description. For example, in the case where there is a transfer request to be desired to supply the image data after converting into such as SDTV display (720 pixels×480 pixels), the image data processing unit 8 is continuously driven without halting.

The transfer data transmitted from the communication unit 12 via the transfer data selecting unit 11 is transmitted to the terminal device 200 as a demander via the communication network 50. In the terminal device 200, the transmitted compressed transfer data is appropriately extended and monitored in a monitor unit or the compressed image data is recorded whenever necessary.

In the absence of the transfer data corresponding to a designated time period, the transfer data for displaying "No Data" on OSD (On Screen Display) is delivered, or a black screen or a blue screen may be displayed, which can be prepared in advance as an action in the case where there is no transfer data.

FIG. 4 is a conceptual view when the time-sharing management unit 13 controls the multi-codec unit 9. In the drawing, it is assumed that a maximum processing ability of the multi-codec unit 9 is 30 frames per second (30 fps) in the case where the image size is VGA (640 pixels×480 lines).

(a) in FIG. 4 shows a state of the multi-codec unit 9 in the case where the image data having the image size VGA is processed. When CH1, CH2 and CH3 are cyclically switched per frame as shown in FIG. 3, CH1, CH2 and CH3 respectively have the frame rates of 10 fps.

More specifically, VGA×30 fps=VGA (CH1)×10 fps+ VGA (CH2)×10 fps+VGA (CH3)×10 fps, is obtained. This satisfies the conditional expression in the time-sharing control of the multi-codec unit 9, $S \cdot T \geq S_0 \cdot t_0 + S_1 \cdot t_1 + \ldots + S_{n-1} \cdot t_{n-1}$. S denotes a maximum size of the image data, T denotes a maximum frame rate, S·T denotes a maximum processing ability of the multi-codec unit 9, $S_0, S_1 \ldots S_{n-1}$ respectively denote sizes of n number of image data, and $t_0, t_1 \ldots t_{n-1}$ denote frame rates of the respective image data.

(b) in FIG. 4 shows a state of the multi-codec unit 9 in the case where the image data having the image size QVGA (320 pixels×240 lines) is processed. QVGA denotes an image size that is ¼ of the VGA. Therefore, four frames can be processed in the same time period (1/30 second).

Similarly, also with respect to a processing state in the present case, VGA×30 fps=QVGA×30 fps+QVGA×30 fps+ QVGA×30 fps+QVGA×30 fps, is obtained. This also satisfies the conditional expression in the time-sharing control of the multi-codec unit 9.

(c) in FIG. 4 shows a state of the multi-codec unit 9 in the case where the processing is carried out under the different image data such as the QVGA and QCIF image sizes (176 pixels×144 lines) and JPEG thumb-nail size (160 pixels×120 lines). As far as the conditional expression in the time-sharing control of the multi-codec unit 9 is satisfied, it may not be necessary that the image size is same.

Figure 5:
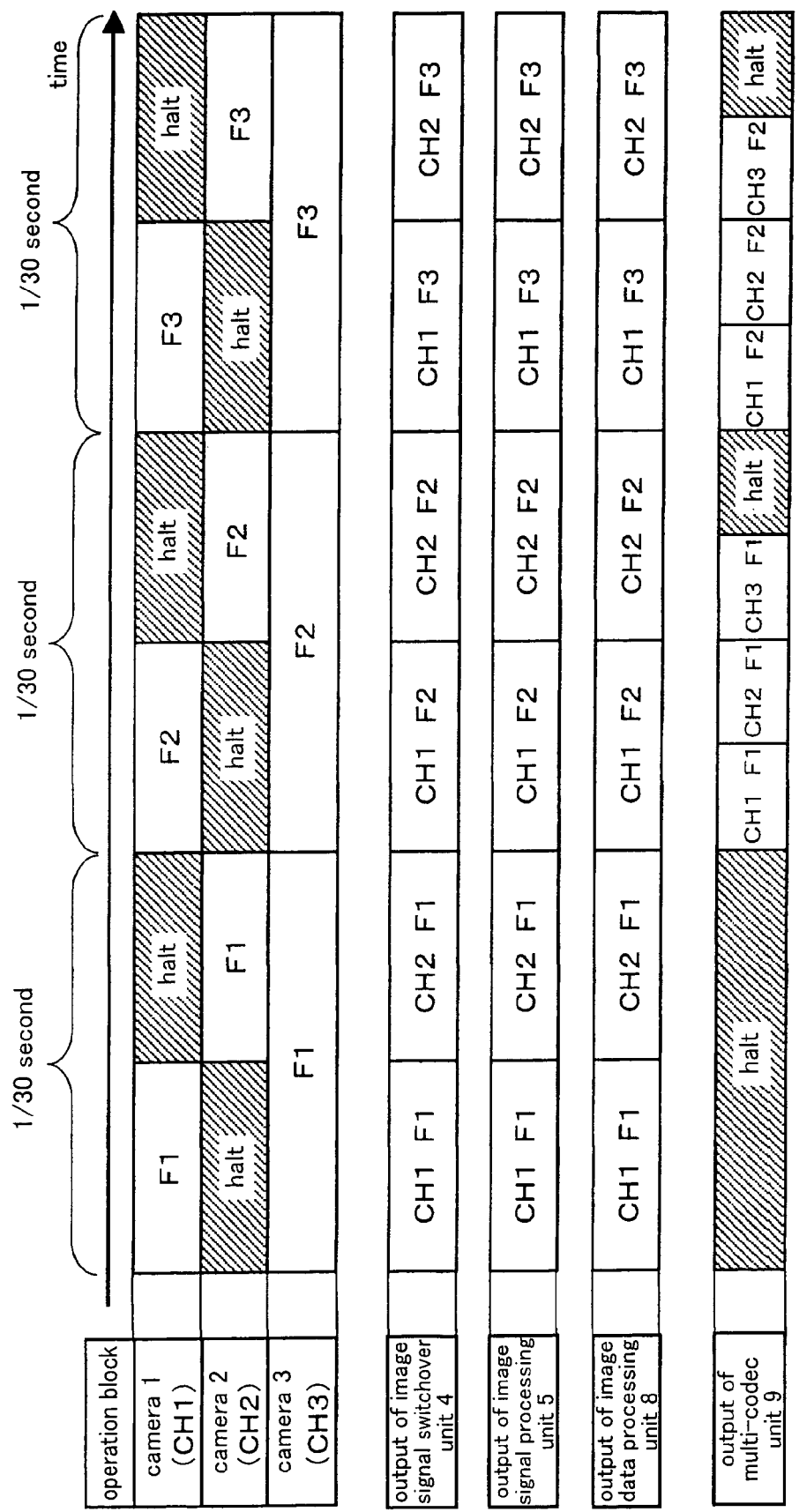
FIG. 5 is a view of respective block processing states in the case where an image having a size shown in (b) in FIG. 4 is fetched by respective cameras in the preferred embodiment.

FIG. 5 shows a processing state of the image data transfer processor 100 in the case where the data transfer in the image size QVGA, which is shown in (b) of FIG. 4, is requested from the terminal device 200 in any of the three cameras 1, 2 and 3. The following operations are executed based on the control by the time-sharing management unit 13.

Operation in a first half of a first period whose basic time period is 1/30 second The first and third cameras 1 and 3 are driven, while the second camera 2 is halted, and the power consumption is thereby controlled.

In accordance with the driving of the foregoing cameras, the image signal switchover unit 4 selects the image signal of the frame F1 in CH1 and outputs the selected image signal to the image signal processing unit 5.

The image signal processing unit 5 converts the image signal of the frame F1 in CH1 to such a format that can be handled in the image data processing unit 8, and outputs the format-adjusted image signal to the image data processing unit 8.

The image data processing unit 8 converts the format-adjusted image signal of the frame F1 in CH1 into the image data, and stores the converted image data in the memory device 20 via the memory controller 7.

After a unit of period has passed, the multi-codec unit 9 reads the image data of the frame F1 in CH1 from the memory device 20 via the memory controller 7 and compression-encodes the read image data, and adds the channel discrimination signal and the time code signal showing CH1 to the compression-encoded image data and stores the resulting image data in the memory device 20 again. The image data of the frame F1 in CH1 is the QVGA data.

Operation in a latter half of the first period whose basic time period is 1/30 second
- The second and third cameras 2 and 3 are driven, while the first camera 1 is halted, and the power consumption is thereby controlled.
- Corresponding to a driving of the foregoing cameras, the image signal switchover unit 4 selects and outputs the image signal of the frame F2 in CH2 of the second camera 2.
- The image signal processing unit 5 converts the image signal of the frame F1 in CH2 to such a format that can be handled in the image data processing unit 8, and outputs the format-adjusted image signal to the image data processing unit 8.
- The image data processing unit 8 converts the format-adjusted image signal of the frame F1 in CH2 into the image data, and stores the converted image data in the memory device 20.
- After a unit of period has passed, the multi-codec unit 9 reads the image data of the frame F1 in CH3 from the memory device 20 via the memory controller 7 and compression-encodes the read image data, and adds the channel discrimination signal and the time code signal showing CH2 to the compression-encoded image data and stores the resulting image data in the memory device 20 again. At this time, the image data of the frame F1 in CH2 is the QVGA data.
- The third camera 3 is not halted but continuously driven.
- The image data of the frame F1 in CH3 is inputted to the image data input unit 6.
- The image data input unit 6 converts the image data of the frame F1 in CH3 to such a format that can be handled in the image data processing unit 8, and stores the format-adjusted image data in the memory device 20 via the memory controller 7.
- The image signal processing unit 5 and the image data processing unit 8 do not function with respect to the image data in CH3.
- After a unit of period has passed, the multi-codec unit 9 reads the image data of the frame F1 in CH3 from the memory device 20 via the memory controller 7 and compression-encodes the read image data, and adds the channel discrimination signal and the time code signal showing CH3 to the compression-encoded image data and stores the resulting image data in the memory device 20 again. The image data of the frame F1 in CH3 is also the QVGA data.

As described above, the multi-codec unit 9 sequentially reads the image data of each channel and compression-encodes the read image data. The image data thus compression-encoded becomes the transfer data requested to transfer and is stored as the transfer-requested transfer data in the memory device 20 via the memory controller 7. The multi-codec unit 9 can process the image data of QVGA by four frames in 1/30 second. Therefore, in each period whose unit of period is 1/30 second, there is extra time after the image data in CH1, CH2 and CH3 is compressed. The time-sharing management unit 13 halts the multi-codec unit 9 in the extra time zone so that the power consumption can be reduced.

Figure 6:
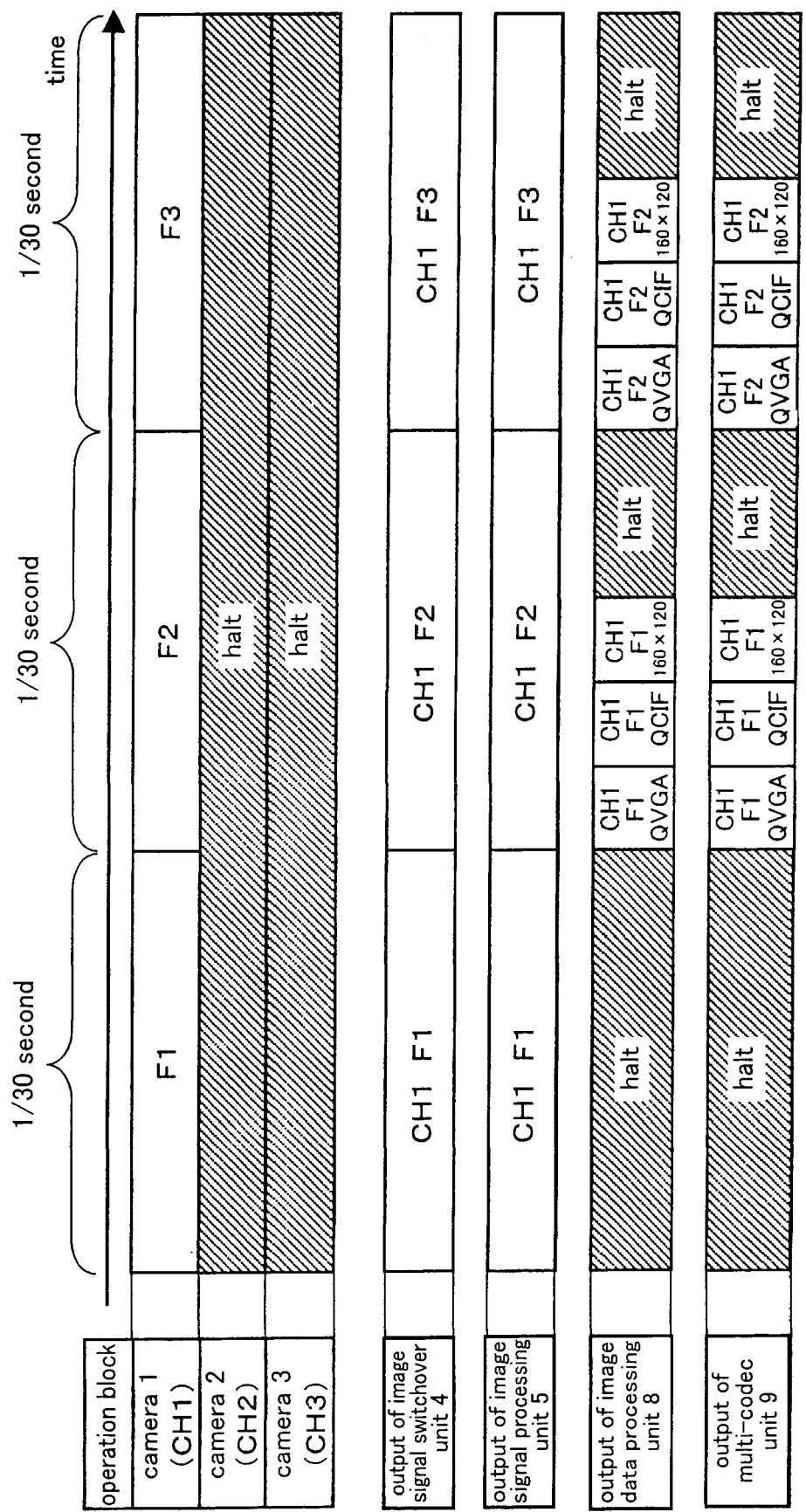
FIG. 6 is a view of respective block processing states in the case where an image data processing unit outputs a plurality of image data with respect to one image signal in the preferred embodiment.

FIG. 6 shows a processing state of the image data transfer processor 100 in the case where the transfer request of the image data with a plurality of formats is made with respect to one of the cameras from the three terminal devices 200. The following operations are executed based on the control of the time-sharing management unit 13. As an example of the transfer request mentioned above, description is given to the state where the image data of the QVGA size (320 pixels×240 lines), QCIF size (176 pixels×144 lines) and JPEG thumb-nail size (160 pixels×120 lines) are requested to be transferred in the first camera 1.
- The first camera 1 is constantly driven, while the second and third cameras 2 and 3 are halted on a steady basis.
- The image signal switchover unit 4 constantly selects and outputs the image signal in CH1.
- The image signal processing unit 5 converts the image signal in CH1 to such a format that can be handled in the image data processing unit 8, and outputs the format-adjusted image signal to the image data processing unit 8.
- The image data processing unit 8 converts the format-adjusted image signal in CH1 sequentially into the image data of QVGA size, QCIF size and JPEG thumb-nail size, and sequentially stores the converted image data in the memory device 20.
- After a unit of period has passed, the multi-codec unit 9 sequentially reads the respective image data of QVGA size, QCIF size and JPEG thumb-nail size of the frame F1 in CH1 from the memory device 20 via the memory controller 7 and compression-encodes the read image data, and then adds the channel discrimination signal and the time code signal showing CH1 to the respective compression-encoded image data and stores the resulting image data in the memory device 20 again.

In the foregoing operations, there results an extra time zone in each frame after the respective image data of QVGA, ACIF and JPEG thumb-nail sizes are sequentially processed by the image data processing unit 8 and the multi-codec unit 9. The time-sharing management unit 13 halts the image data processing unit 8 and the multi-codec unit 9 in the extra time zone to thereby reduce the power consumption. In the foregoing description, the image data processing unit 8 sequentially processes the image data of the respective sizes, however, may simultaneously convert the image data with the plurality of sizes.

Figure 7:
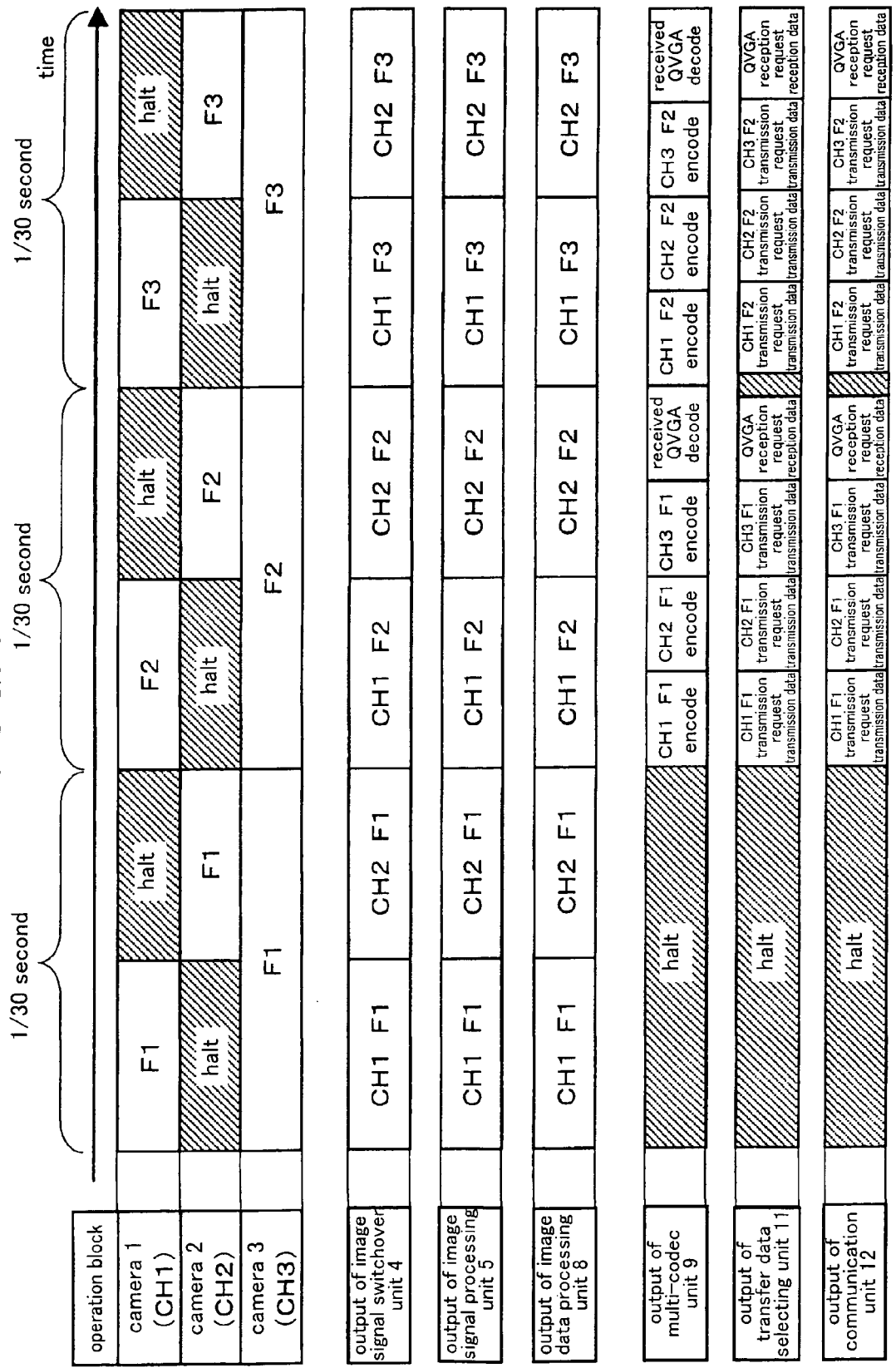
FIG. 7 is a view of respective block processing states in the case where transfer data of QVGA is received in the state shown in FIG. 5 in the preferred embodiment.

FIG. 7 shows a processing state in the case where the transfer data of QVGA is further received from outside in the operation state described above referring to FIG. 5. A description is given below based on an example where the transfer data of QVGA transmitted from the terminal device 200 is received by the communication unit 12 of the relevant image data transfer processor 100 via the communication network 50.
- The transfer data is stored in the memory device 20 from the transfer data selecting unit 11 via the memory controller 7.
- The multi-codec unit 9 reads the transfer data of QVGA from the memory device 20 and extends it, and stores the extended image data in the memory device 20 via the memory controller 7.
- The display unit 10 reads the extended image data from the memory device 20 and outputs it to the display device 30.

Figure 8:
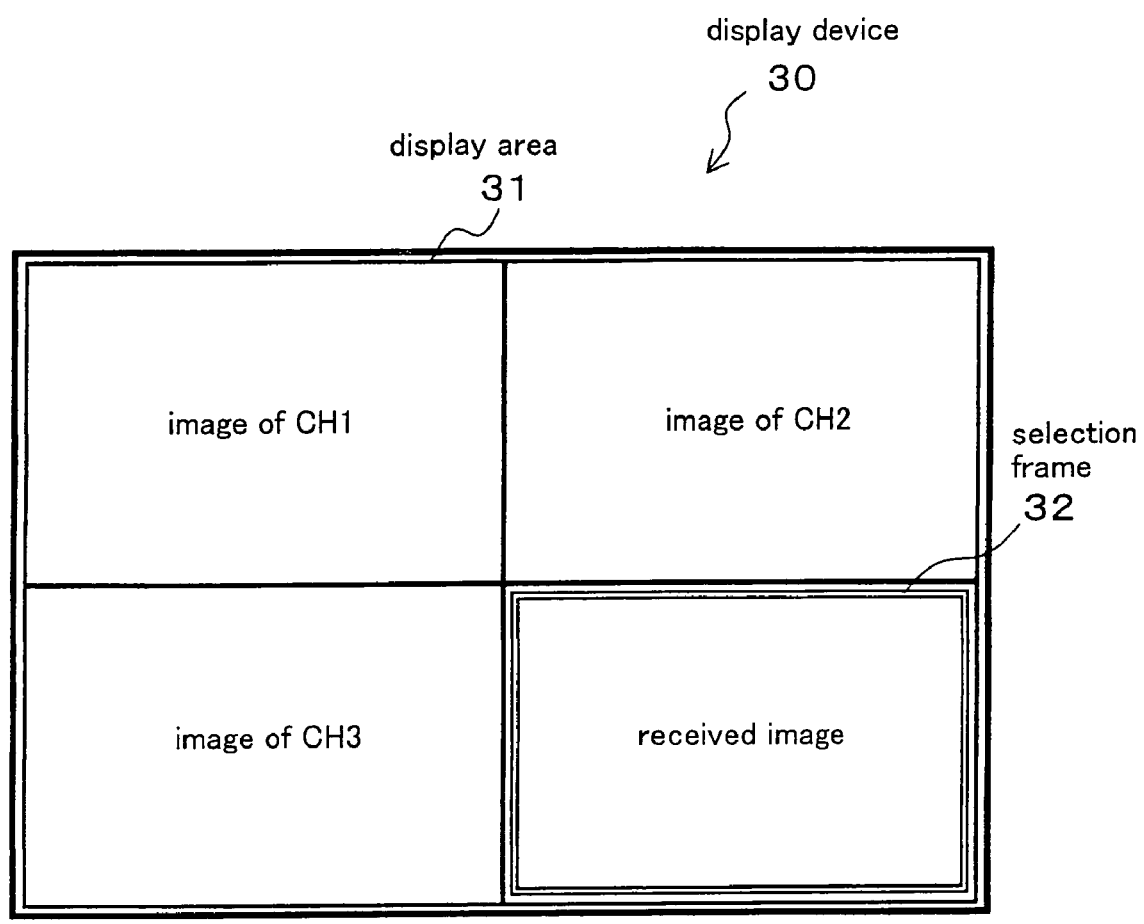
FIG. 8 shows images displayed in a display device in the state shown in FIG. 7 in the preferred embodiment.

FIG. 8 shows an image displayed on the display device 30 at the time. In FIG. 8, a reference numeral 31 denotes a display area of the display device 30. As shown in FIG. 8, the image data of the received transfer data is also displayed on the display device 30 in addition to the display of the image data in CH1-CH3.

When the user operates the operation unit 40, a selection frame 32 is displayed on the display device 30. When the image data is selected in the operation unit 40 in the state where the selection frame 32 is displayed, the image data selected in the selection frame 32 is displayed under enlargement. When the forced transfer is performed in the state where the selection frame 32 is displayed, the transfer data of the image data selected in the selection frame 32 is transferred in relation to the transfer request of the terminal device 200.

Figure 9:
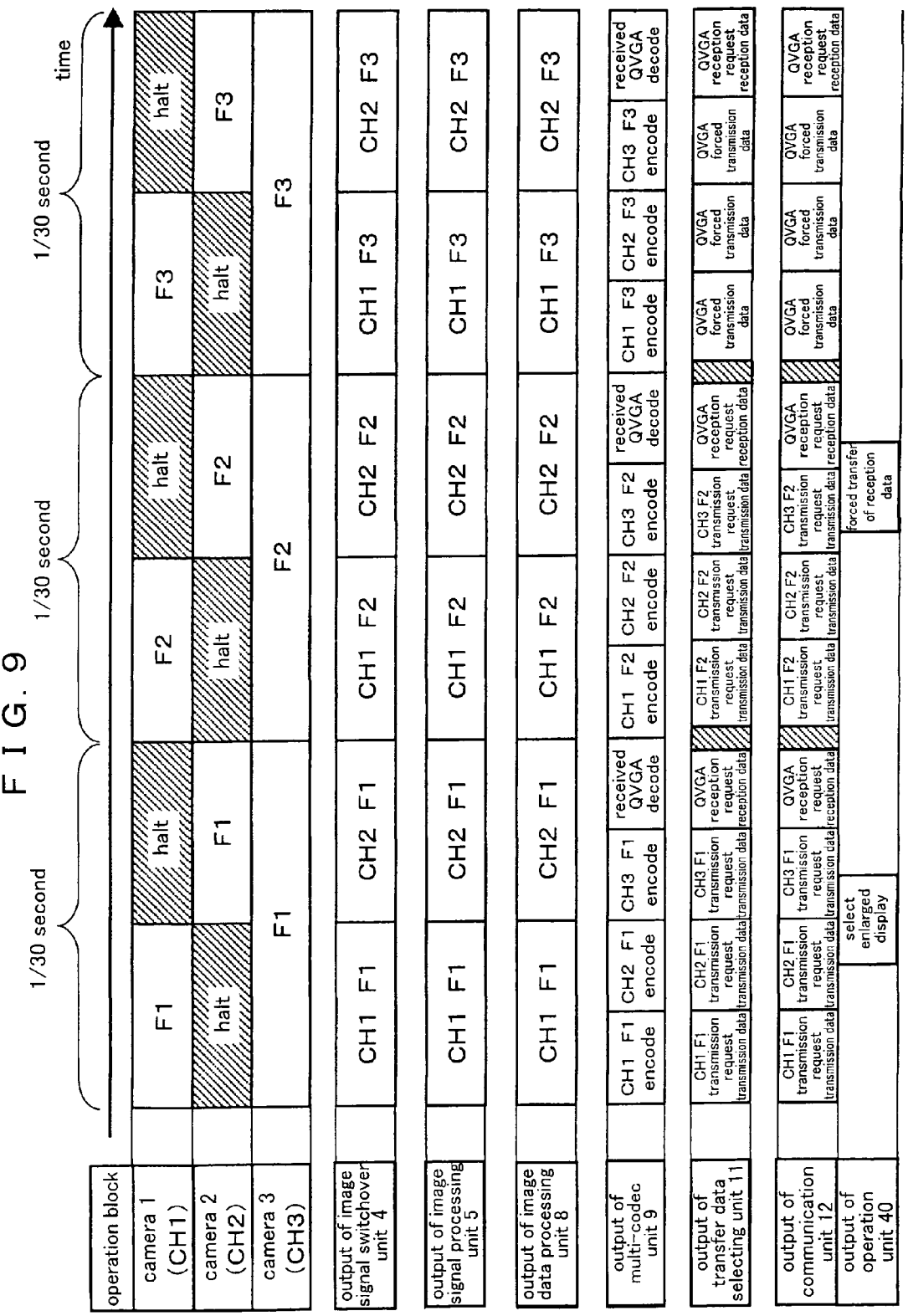
FIG. 9 is a view of respective block processing states in the case where a forcible transfer operation is executed in the preferred embodiment.

FIG. 9 shows a processing state of the image data transfer processor 100 at the time. As shown in change of the display from the state shown in FIG. 7 to the state shown in FIG. 9, the operator selects the enlarged display on the display device 30 by operating the operation unit 40 to thereby confirm the image, and then performs the forced transfer in order to distribute the confirmed image. On and after the frames subsequent to the frame to which the forced transfer was executed, the transfer data delivered to each terminal device is handled as the received transfer data. In the case where the size of the transfer request is different in each of terminal devices at the time, the image data is resized in the image data processing unit 8 so that the image size is converted into such a size that is demanded by each terminal device, and then, the data is transferred.

Figure 10:
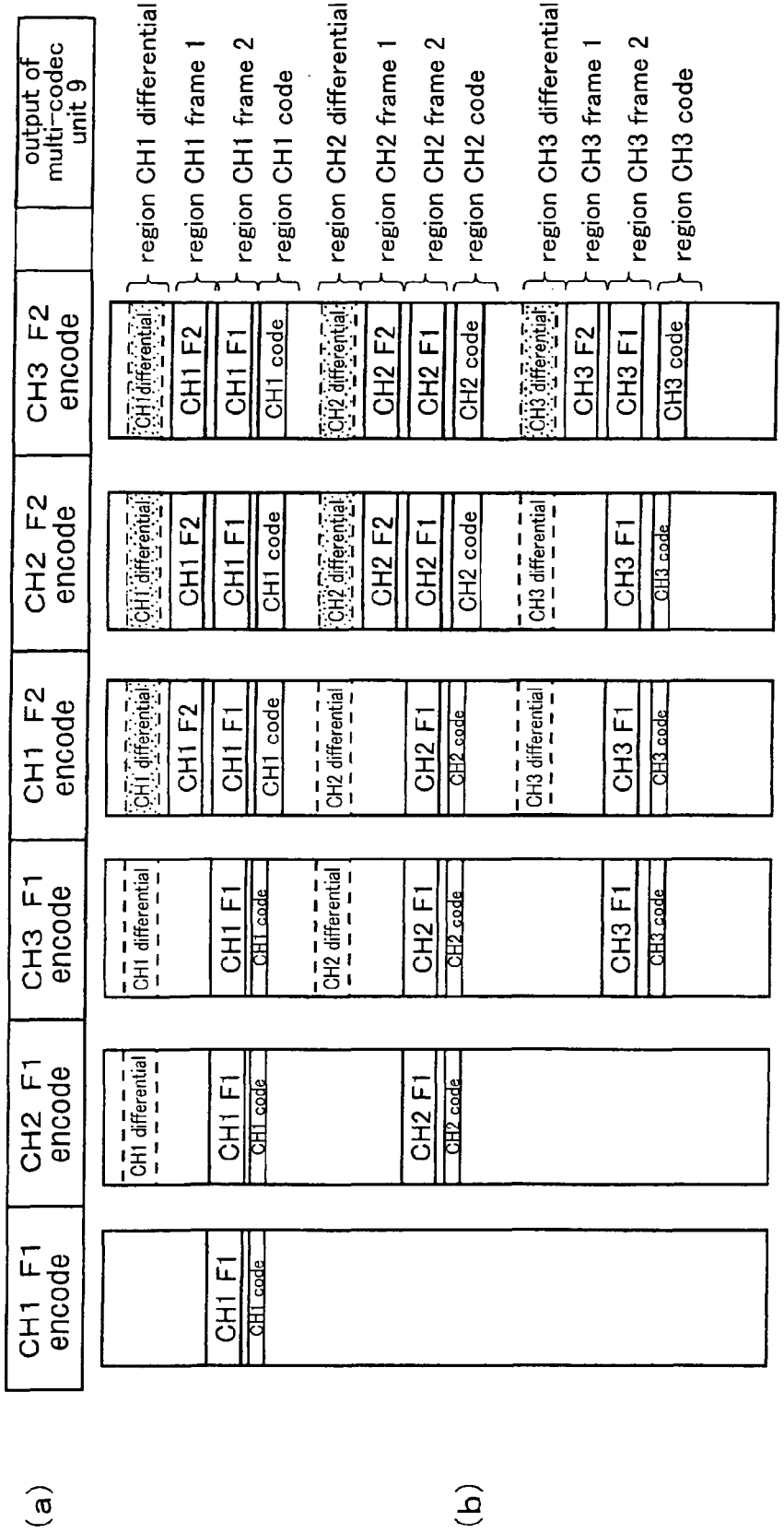
FIG. 10 shows an memory image when a multi-codec processing is executed.

FIG. 10(a) shows a state of the multi-codec unit 9, and FIG. 10(b) shows a image for storing data on the memory that corresponds to the state of the multi-codec unit 9. The multi-codec unit 9 stores a differential data between each frame and the previous frame in the memory device 20 via the memory controller 7 every time when the plurality of image data is compressed. When the image data in the next frame is compressed, the multi-codec unit 9 reads the differential data of the relevant channel, image data of the frame prior to the relevant channel and image data of the frame subsequent to the relevant channel from the image data memory device 20.

The data required in a multi-encoding process is mapped on a logic address that is a linear address space corresponding to an actual address and stored in the memory. In encoding the image data of the frame F1 in CH1, the image data of the frame F1 is stored in the memory. Next, in encoding the image data of the frame F2 in CH1, the differential data between the frames F1 and F2 is generated and therefore the differential data is also stored in the memory. In the case of the data compression using the differential data such as MPEG, the differential data before the frame F2 is used for the data compression with respect to the frame F2 and the frames subsequent thereto. After a region of the CH1 differential, a region of the frame 1 in CH1, a region of the frame 2 in CH1, and a region of the CH1 code are secured on the memory, an address map is constituted so that these regions do not overlap one another.

Since the encoding process is continuously executed, the image data of the previous frame and the image data of the current frame are respectively stored in the region of the frame 1 and the region of the frame 2. In a manner similar to the processing of image data of the frame F2 in CH1, the differential data generated in the previous frame in the region of the differential data is overwritten through processing the image data in the current frame.

The address map is constituted with respect to CH2 and CH3 in a manner similar to CH1, and the multi-codec unit 9 updates the data in each region. The frame data comprises two banks. In the constitution where the multi-codec unit 9 outputs the image data of the current frame, the image data outputted from the image data processing unit 8 is stored in the region of the frame 1, and the image data of the current frame, which is the previous frame when the subsequent frame is processed (outputted by the multi-codec unit 9), is stored in the region of the frame 2. Thereby, the memory regions are used in the state where the memory accesses of the respective processing units are carved.

The present invention is not limited to the foregoing preferred embodiment, and may be implemented as follows.

1) The number of the plurality of cameras is three in the preferred embodiment, however, more than three cameras may be connected. By doing this, the images at a larger number of points can be monitored.
2) The transfer data is not encrypted in the preferred embodiment, however, the transfer data may be encrypted in the communication unit by means of an encrypting method such as RSA (Rivest Shamir Adleman) which is conventionally known, and then transferred.
3) As shown in a virtual line in FIG. 1, a plurality of image data transfer processors 100 may be connected to enable intercommunication between them via the communication network 50. In this case, the transfer data selecting unit 11 of each image data transfer processor 100 transmits the transfer request received from the operation unit 40 to the other image data transfer processing unit 100, and then receives the transfer data transmitted from the other image data transfer processor 100 via the communication unit 12 in accordance with the transfer request. The multi-codec unit 9 converts the received transfer data into the image data. The image data processing unit 8 resizes the image data converted from the received transfer data. The display unit 10 outputs the resized image data to the display device 30. As a result, not only the transmission but also the reception of the transfer data can be realized.

Though the present invention is described in detail based on the preferred embodiments of the invention, it will be understood that various modifications may be made therein, and it is intended to cover in the appended claims all such modifications as fall within the true spirit and scope of this invention.

What is claimed is:

1. An image data transfer processor comprising:
    an image data processing unit for converting an image signal into an image data;
    a multi-codec unit for converting the image data into a transfer data;
    a communication unit for receiving a transfer request from an external terminal device and transmitting the transfer data to the terminal device;
    a time-sharing management unit for controlling to drive the image data processing unit and the multi-codec unit in a time-sharing manner in accordance with the transfer request; and
    a transfer data selecting unit for selecting the transfer data corresponding to the transfer request from the transfer data generated by the image data processing unit and the multi-codec unit which are controlled to drive in the time-sharing manner by the time-sharing management unit, and transmitting the selected transfer data to the communication unit,
    wherein the time-sharing management unit controls the multi-codec unit in the time-sharing manner under such a condition as $S \cdot T \geq S_0 \cdot t_0 + S_1 \cdot t_1 + \ldots + S_{n-1} \cdot t_{n-1}$, provided that a largest size of the image data is S, a maximum frame rate is T when the largest size of the image data is S, the sizes of n number of image data are $S_0, S_1, \ldots S_{n-1}$, and the frame rates of the respective image data are $t_0, t_1, \ldots t_{n-1}$.

2. The image data transfer processor according to claim 1, wherein:
    the image signal is a plurality of image signals having formats different from each other,
    the image transfer processor further comprises an image signal processing unit for converting the inputted image signals to a predetermined format which can be processed in the image data processing unit by rearranging pixel values thereof and outputting the format-converted image signals to the image data processing unit, and the image data transfer processor further comprises;
- a memory device; and
- a memory controller, wherein the image signal processing unit stores the format-converted image signal in the memory device via the memory controller, the image data processing unit reads the format-converted image signal from the memory device via the memory controller and converts the read image signal into the image data, and then, stores the image data in the memory device via the memory controller, the multi-codec unit reads the image data from the memory device via the memory controller and converts the read image data into the transfer data, and then, stores the transfer data in the memory device via the memory controller, and the transfer data selecting unit reads the transfer data from the memory device via the memory controller and outputs the read transfer data to the communication unit.

3. The image data transfer processor according to claim 2, wherein:
   the image data processing unit converts a plurality of image data from the plurality of image signals,
   the multi-codec unit stores a differential data between each frame and a frame prior to the each frame in the memory device via the memory controller, and
   when the image data in the next frame of the respective frames of the plurality of image data is converted into the transfer data, the multi-codec unit reads the differential data between the relevant frame and the previous frame, the image data of the previous frame and the image data of the next frame from the memory device via the memory controller, and executes the processing based on these data.

4. The image data transfer processor according to claim 3, wherein the multi-codec unit stores the image data of the next frame in a recording region different from that of the last frame of the next frame in the memory device every time when the plurality of image data is converted into the transfer data.

* * * * *